United States Patent
Cole et al.

(10) Patent No.: US 6,316,725 B1
(45) Date of Patent: Nov. 13, 2001

(54) HOUSINGS FOR UNDERFLOOR RACEWAYS

(75) Inventors: Michael T. Cole, Parkersburg; John P. Penczak, Washington, both of WV (US); Thomas R. Russo, Bristol, CT (US); Joe Young, Reedsville, OH (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 09/490,201

(22) Filed: Jan. 24, 2000

Related U.S. Application Data

(63) Continuation-in-part of application No. 09/211,464, filed on Dec. 14, 1998.

(51) Int. Cl.⁷ .................................................. H02G 3/04
(52) U.S. Cl. ............................ 174/48; 174/58; 220/4.02; 439/535
(58) Field of Search ................................ 174/48, 49, 58, 174/17 R, 63, 52.6, 50; 52/220.1, 220.3, 220.5, 220.7; 220/3.2, 3.3, 3.6, 3.8, 3.94, 4.02, 4.08; 439/535

(56) References Cited

U.S. PATENT DOCUMENTS

| | | | |
|---|---|---|---|
| 1,205,589 | * 11/1916 | Young | 220/3.92 |
| 4,247,738 | 1/1981 | Bonato . | |
| 4,295,575 | 10/1981 | Flachbarth . | |
| 4,443,654 | 4/1984 | Flachbarth et al. . | |
| 4,536,612 | 8/1985 | Domigan . | |
| 4,922,672 | 5/1990 | Bartee et al. . | |
| 5,344,106 | * 9/1994 | Beele | 248/56 |
| 5,350,884 | 9/1994 | Littrell . | |
| 5,614,695 | 3/1997 | Navazo . | |
| 5,736,676 | 4/1998 | Stelter et al. . | |
| 5,879,185 | * 3/1999 | Handler et al. | 439/538 |

FOREIGN PATENT DOCUMENTS 2 082 957  3/1982  (GB) .

* cited by examiner

*Primary Examiner*—Dean A. Reichard
*Assistant Examiner*—Dhiru R Patel
(74) *Attorney, Agent, or Firm*—McAndrews, Held & Malloy, Ltd.

(57) ABSTRACT

An housing is configured for connection to the raceway panels by removing the concrete above the raceway panel, cutting a hole in the raceway panel, and securing the housing in the hole in the raceway panel. Alignment clips allow the afterset housings to be ganged together to form an integral afterset assembly. Each alignment clip is configured to slidably engage with a pair of the afterset housings. In one embodiment, the afterset housing includes a preset housing that is normally configured for connection to the raceway panel prior to pouring of the concrete floor, and an adapter connectable to the preset housing and being constructed to reconfigure the preset for use as an afterset housing which is adapted for connection to the raceway panel following pouring of the concrete floor.

29 Claims, 16 Drawing Sheets

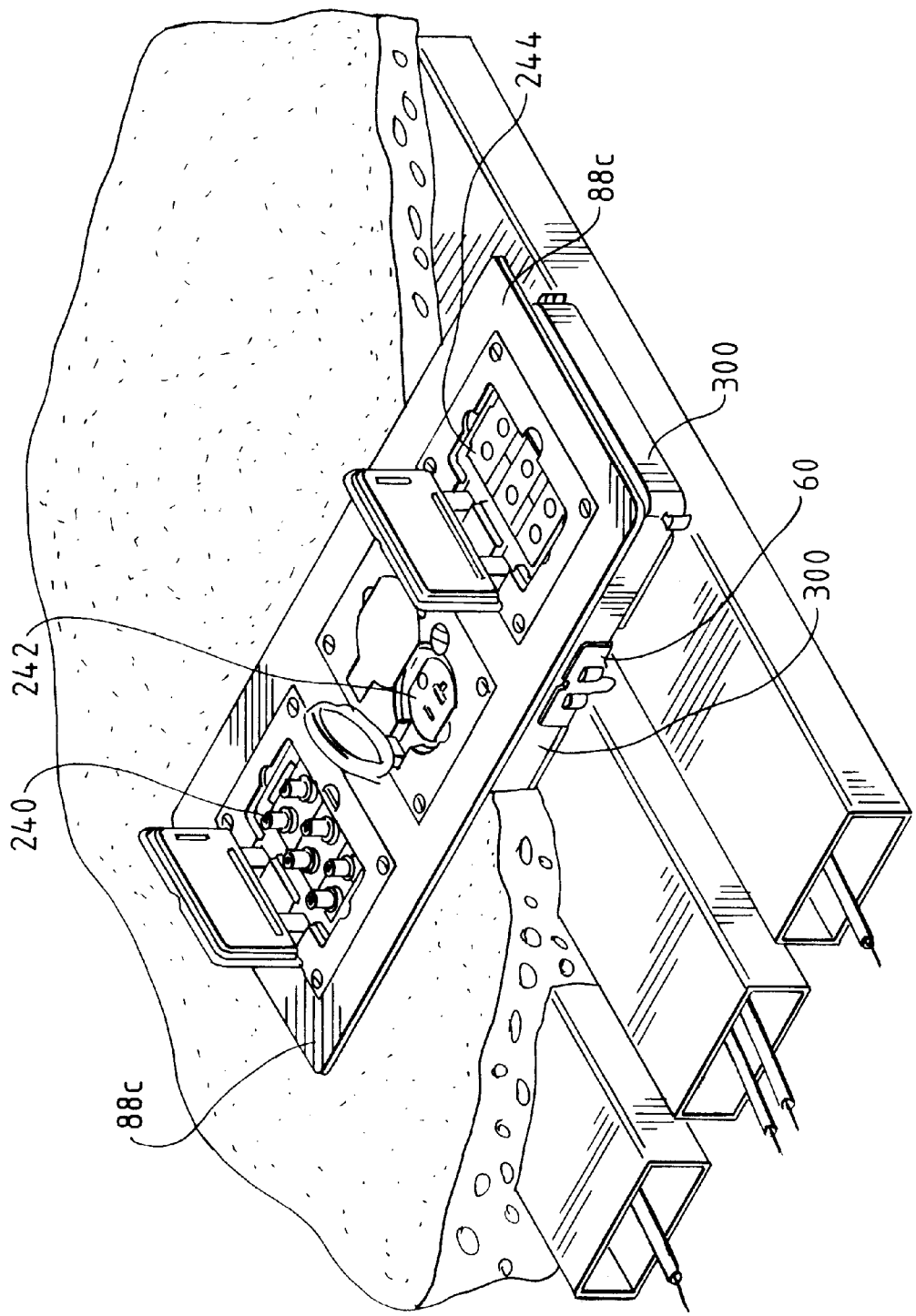

HOUSINGS FOR UNDERFLOOR RACEWAYS

CROSS-REFERENCE TO RELATED APPLICATIONS

This application is a continuation-in-part of application Ser. No. 09/211,464, filed on Dec. 14, 1998.

STATEMENT REGARDING FEDERALLY SPONSORED RESEARCH OR DEVELOPMENT

NOT APPLICABLE

BACKGROUND OF THE INVENTION

This invention relates generally to underfloor electrical distribution systems, and, more particularly, to improved underfloor preset and afterset housings. Modern office buildings require electric power, communication, and computer data services in various combinations at a large number of locations. In many instances these needs are addressed by underfloor distribution systems consisting of a network of ducts or raceways that are mounted in concrete floors. Access to the underfloor service raceways may be obtained through preset housings that mount on the raceways at regular intervals, usually 24 inches on center, before the concrete floor is poured. The preset defines a hollow interior compartment that is interconnected with the interior of the duct to provide access to the services that are carried in the raceway. The preset includes a removable mud cap that is generally parallel to the surface of the floor and is positioned slightly below the surface of the concrete floor. The mud cap serves to prevent concrete from entering the interior compartment of the preset when the floor is poured. After the concrete floor has hardened, the concrete above the mud cap is broken away and the mud cap is removed to provide access to the interior of the preset. An activation assembly that provides for power or data outlets may then be installed on the preset.

Access to the raceways may also be provided through afterset housings that are attached to the raceway after the concrete floor has been poured and is set. Aftersets are installed by cutting a hole in the concrete above the raceway and then securing the afterset to an opening that is cut in the raceway after the concrete has been removed to provide access to the raceway. Like a preset, the afterset defines hollow interior compartment that is interconnected with the interior of the raceway to provide access to the services that are carried in the raceway. The afterset is configured to support various activation kits, such as duplex outlets, phone outlets, coaxial connectors or fiber optics connectors.

In both presets and aftersets it is desirable to provide a housing that is gangable so that multiple services can be provided at a single location.

BRIEF SUMMARY OF THE INVENTION

One object of the present invention is to provide a preset that can be converted for use as an afterset housing.

Another object of the present invention is to provide presets and afterset housings that are gangable to provide multiple services at a single location.

A further object of the present invention is to provide a manner for aligning and interconnecting preset and afterset housings carried by adjacent raceway panels.

Still another object of the invention is to provide preset and afterset housings that can accommodate a wide variety of activation assemblies.

Yet another object of the invention is to provide preset and afterset housings that are economical to manufacture in mass production, and easy to install in the field.

According to one aspect of the present invention, afterset housings are provided and are configured for connection to the raceway panels by removing the concrete above the raceway panel, cutting a hole in the raceway panel, and securing the housing in the hole in the raceway panel. Alignment clips allow the afterset housings to be ganged together to form an integral afterset assembly. Each alignment clip is configured to slidably engage with a pair of the afterset housings. In one embodiment, the afterset housing comprises a preset housing that is normally configured for connection to the raceway panel prior to pouring of the concrete floor, and an adapter connectable to the preset housing and being constructed to reconfiguring the preset for use as an afterset housing which is adapted for connection to the raceway panel following pouring of the concrete floor.

BRIEF DESCRIPTION OF THE SEVERAL VIEWS OF THE DRAWING

FIG. 17 is a perspective view showing three ganged afterset housings after activation.

FIGS. 18a to 18i are schematic drawings illustrating an alternative method for installing the afterset housing of FIG. 12 onto a raceway in a concrete floor.

DETAILED DESCRIPTION OF THE INVENTION

Figure 1:
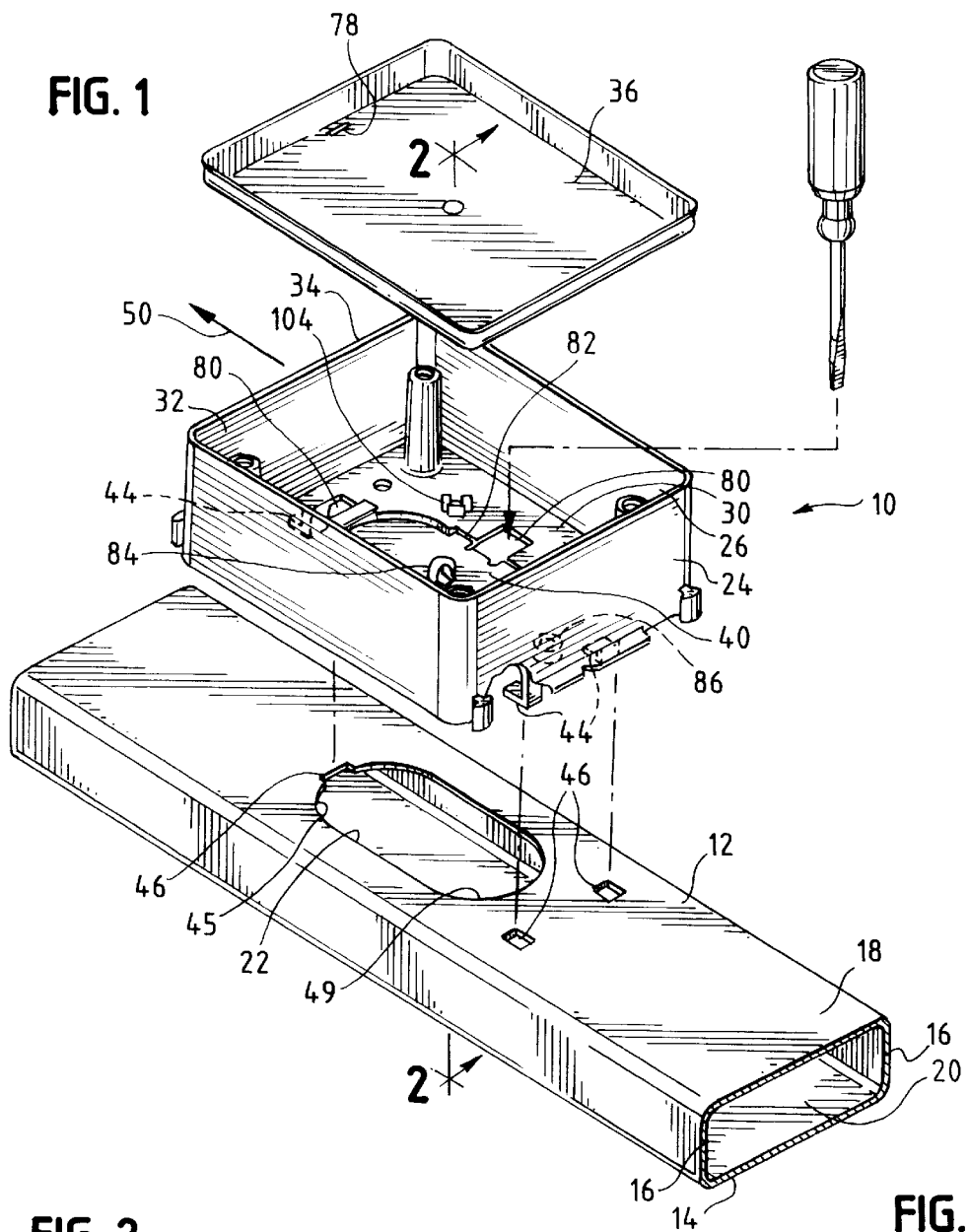
FIG. 1 is an exploded perspective view of a preset housing according to certain aspects of the invention, shown in combination with an underfloor wiring duct.

While the invention will be described in connection with one or more embodiments, it will be understood that the invention is not limited to those embodiments. On the contrary, the invention includes all alternatives, modifications, and equivalents as may be included within the spirit and scope of the appended claims.

Referring now to FIGS. 1–8, an underfloor electrical distribution system 10 includes a plurality of raceway panels 12 (one shown) that are adapted to be positioned on a subfloor prior to pouring of the concrete floor 13. The raceway panels 12 are laid out in accordance with a predetermined pattern to route service cables to desired locations in the building. Each raceway panel 12 consists of a metallic duct of a generally rectangular cross section. The raceway panel 12 has a bottom wall 14, a pair of opposing side walls 16, and an upper wall 18 which define an interior passage 20 for carrying the service cables. Preset openings 22 are formed in the upper wall 18 of the raceway panel 12 to provide access to the interior passage 20.

Presets 24 (one shown in FIG. 1) are configured to be mounted in the preset openings 22 and to provide access to the interior passage 20 of the raceway 12 from the upper surface of the concrete floor 13. The preset 24 defines a hollow interior compartment 26 that is interconnectable with the interior passage 20 of the raceway panel 12 to provide access to the service cables that are carried in the raceway panel 12. In the illustrated embodiment, the preset 24 has a generally rectangular housing consisting of a bottom wall 30, an upstanding side wall 32 defining a top opening 34, and a concrete cap 36 (i.e., mud cap) that is removably mounted in the top opening 34. Although a rectangular housing is illustrated, it should be appreciated that the housing could be cylindrical, for example, without departing from the scope of the present invention. Preferably, the side wall 32 of the preset housing is angled or beveled inwardly a slight amount, e.g. approximately 1.0 degrees from vertical, to restrict upward movement of the housing once the concrete floor has hardened.

Figure 2:
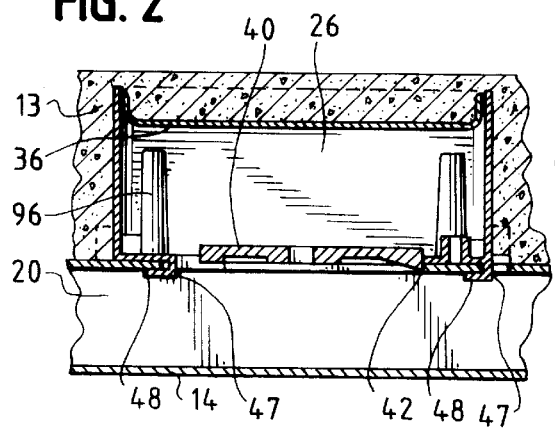
FIG. 2 is cross-sectional view showing the preset housing in a poured concrete floor, prior to installation of the activation assembly.

As shown in FIG. 2, upon installation of the preset 24 and pouring of the concrete floor 13, the concrete cap 36 is generally parallel to the surface of the concrete floor and is positioned slightly below the surface of the concrete floor. The concrete cap 36 serves to prevent concrete from entering the interior compartment 26 of the preset 24 when the concrete floor 13 is poured. After the concrete floor 13 has hardened, the concrete above the concrete cap 36 is broken away and the concrete cap is removed to provide access to the interior 26 of the preset 24 (see FIG. 3). As explained below, an activation assembly that accepts a duplex receptacle or other wiring device may then be installed on the preset 24.

A knockout section 40 is formed in the bottom wall of the preset housing 24. The knockout section 40 is positioned to align with and lockingly engage with the preset opening 22 to secure the preset 24 to the raceway panel 12 prior to and during pouring of the concrete floor 13. For this purpose, the lower edge of the knockout section 40 includes a beveled protrusion 42 (see, e.g., FIGS. 2 and 4B) that extends beyond the plane of the bottom wall 30 of the preset and into the present opening 22. The preset 24 is further secured in the opening 22 by a radial flange 43 that extends downwardly from the bottom wall 30 along the periphery of the knockout 40 on the side opposite that of the beveled protrusion 42. The radial flange 43 is configured to engage against the front edge of the preset opening 22 when the preset is mounted on the raceway panel. The preset 24 further includes a plurality (three in the illustrated embodiment) of locking tabs 44 that extend from the bottom wall 30 and are configured to slidably engage with reciprocal apertures 46 formed in the raceway panel 12 adjacent the preset opening 22. Each locking tab 44 consists of a downwardly extending leg 47 and flange 48 extending generally perpendicular from the bottom end of the leg, i.e., generally parallel to the bottom wall 30 of the preset 12.

Figure 6:
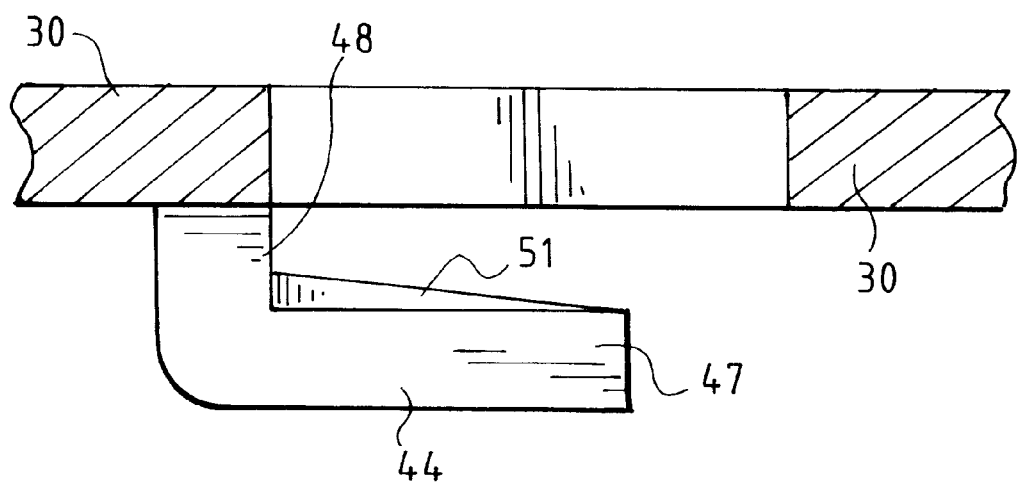
FIG. 6 is a cross sectional view of one of the locking tabs of the preset housing.

The manner by which the preset 24 is attached to the raceway panel 12 is best understood by reference to FIGS. 1 and 2. Initially the locking tabs 44 are aligned with the reciprocal apertures 46 in the raceway panel 12. The tabs 44 are then inserted downwardly into the apertures 46, while the preset is simultaneously slid in the direction of the arrow 50. As the tabs 44 move downwardly into the apertures 46, the lower edge of the protrusion 42 engages against the upper wall 18 of the raceway panel 12. Further downward movement of the preset 12 biases the protrusion 42 upwardly. The preset 24 is slid in the direction of the arrow 50 until the trailing edge of the protrusion 42 extends past the edge of the preset opening 22, at which time the protrusion 42 springs downwardly to lock the preset 24 into the preset opening 22 (see FIG. 2). At this position, the lower flanges 48 of the locking tabs 44 extend under the upper wall 18 of the raceway panel 12, to further secure the preset 24 to the raceway panel 12. Ribs 51 formed in the upper surface of the flanges 48 (see FIGS. 5 and 6) are compressed between the flanges 48 and the upper wall of the raceway as the preset 24 is slid into position to form good ground continuity between the preset 24 and the raceway 12. As can be seen in FIG. 6, the ribs 51 may be beveled or tapered to an increasing height near the back edge of the flange 48. A plurality of ribs 52 (see generally FIG. 10) may be formed in the exterior surface of the bottom wall 30 of the preset 24. As the preset 24 is slid into place, the ribs 52 abrade against the exterior surface of the raceway panel 12 to form good ground continuity between the preset and the raceway panel.

Ribs 51A along sides or legs 47 (FIG. 4B) can also provide ground continuity and restrict lateral movement.

Further movement in the direction of the arrow 50 is restricted by the interface between the legs 47 and the walls of the apertures 46, and also by abutment of the radial flange 43 against the front edge 45 of the preset opening 22. Conversely, movement in the direction opposite the arrow 50 is restricted by abutment of the protrusion 42 against the back edge 49 of the opening 22. If necessary, the preset 24 can be removed prior to pouring the concrete floor by prying out the knockout section 40, or by bending the trailing edge of the protrusion 42 upwardly and sliding the preset 24 in the direction opposite arrow 50.

The preset 24 is preferably formed of a die cast metal, and in particular from Zamak 3 which is commercially available from a variety of suppliers including Eastern Alloys of Maybrook, N.Y., ARCO Alloys Corporation of Detroit Mich., and Imperial Zinc Corporation of Chicago, Ill. Zamak 3 is an alloy of zinc, aluminum, magnesium, and copper. Alternatively, the preset 24 could be formed from other metals or from plastic.

Figure 9:
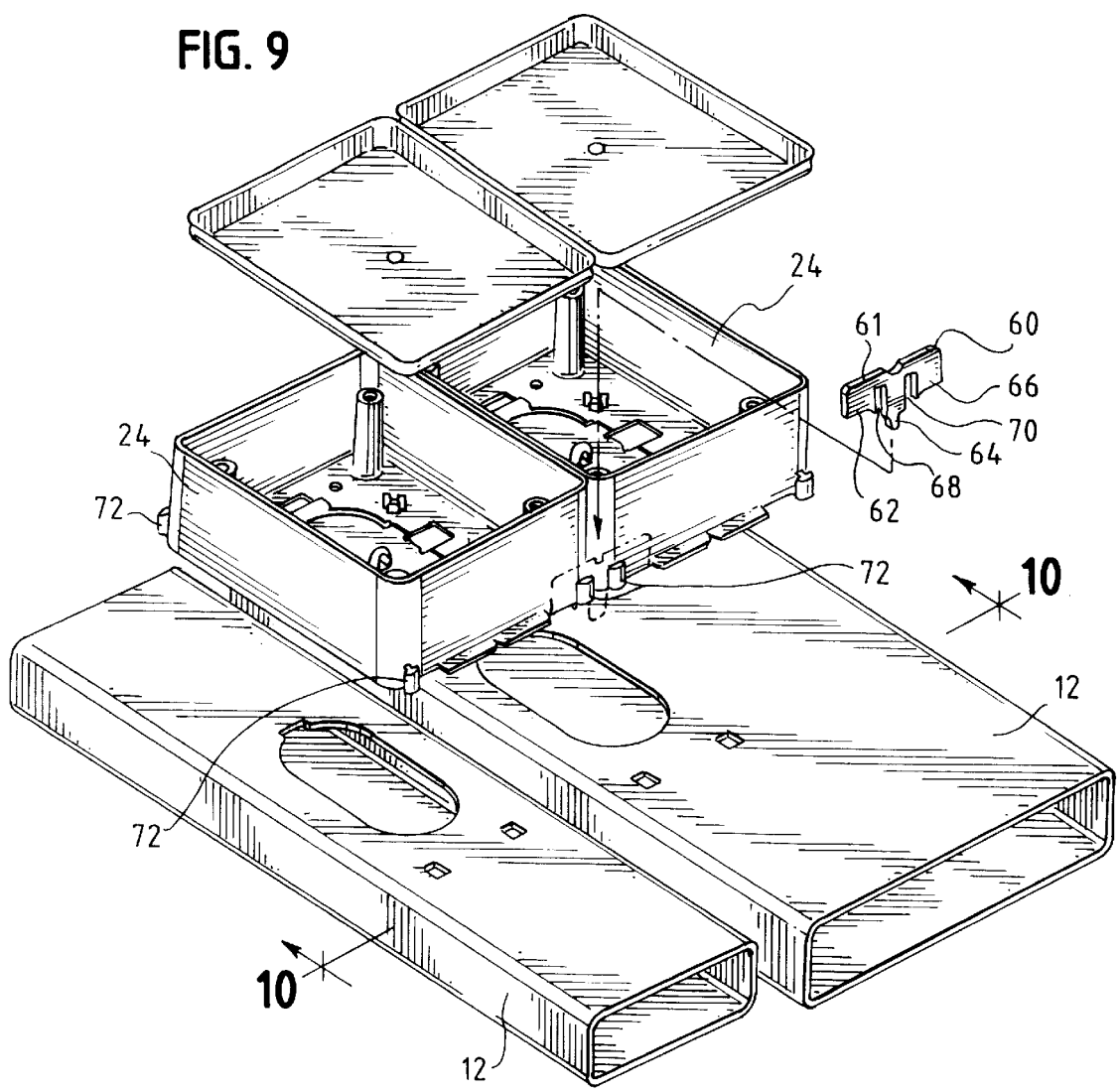
FIG. 9 is an exploded perspective view illustrating a pair of preset insert housings ganged together in accordance with the certain aspects of the present invention.
Figure 10:
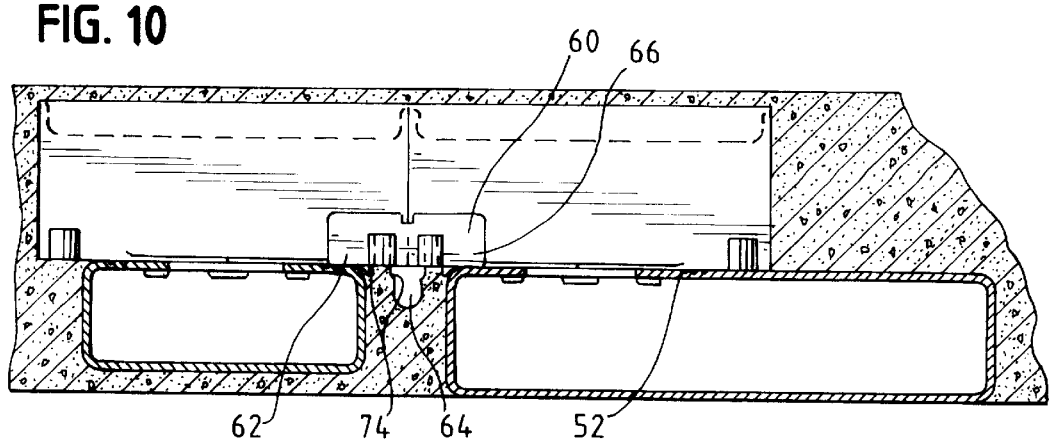
FIG. 10 is a cross-sectional view of a pair of ganged preset housings installed in a poured concrete floor, prior to activation of the preset.
Figure 11:
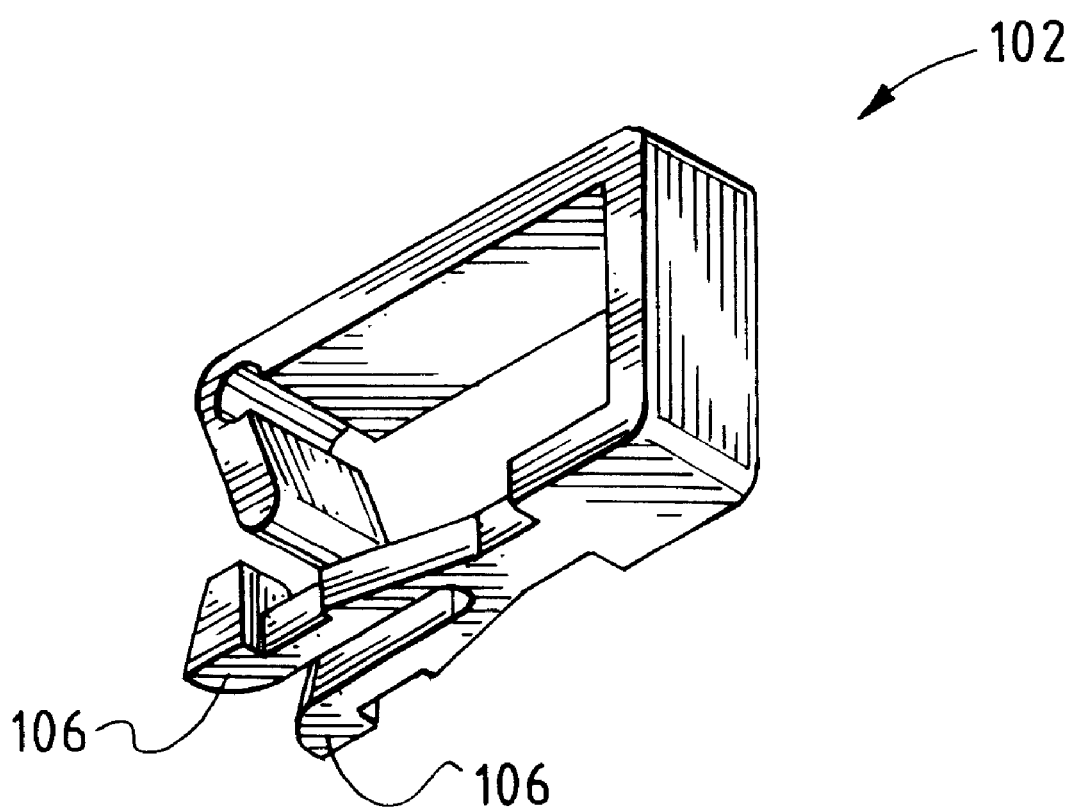

FIGS. 9 and 10 illustrate the use of alignment clips 60 to interconnect and align presets carried by adjacent raceway ducts 12. Each alignment clip 60 has an upper portion 61 and three legs 62, 64, 66 extending downwardly from the upper portion. The legs 62, 64, 66 are separated by vertical slots 68, 70 which configured to engage around tabs 72 that extend from the corners of the presets 24. In addition to interconnecting the presets 24, the alignment clips 60 maintain a uniform space between the presets 22 and hence the adjacent raceway panels 12. The alignment clips 60 are installed by aligning the vertical slots 68, 70 with the tabs 72 on the presets 22. As the alignment clip 60 is pushed or driven downwardly, teeth 74 formed on the lower edges of the legs 62–66 engage against the top edges of the tabs 72. Continued downward pressure on the alignment clip 60 causes the teeth 74 to abrade the tabs 72 that are formed from the relatively softer Zamak 3 material, thereby allowing the clip to slide into place over the tabs 72. (The clips 60 could alternatively be configured to snap into place around the tabs 72.) Heads 76 formed on the ends of the tabs 72 further secure the clip 60 in place on the tabs 72. It will be appreciated that the tabs could, for example, be replaced with slots configured to receive the clips 60.

Figure 3:
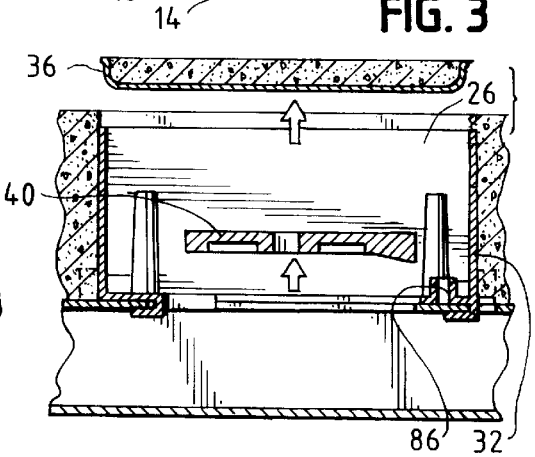
FIG. 3 is a cross-sectional view of the preset housing, illustrating removal of the concrete cap and the knockout section.
Figure 4A:
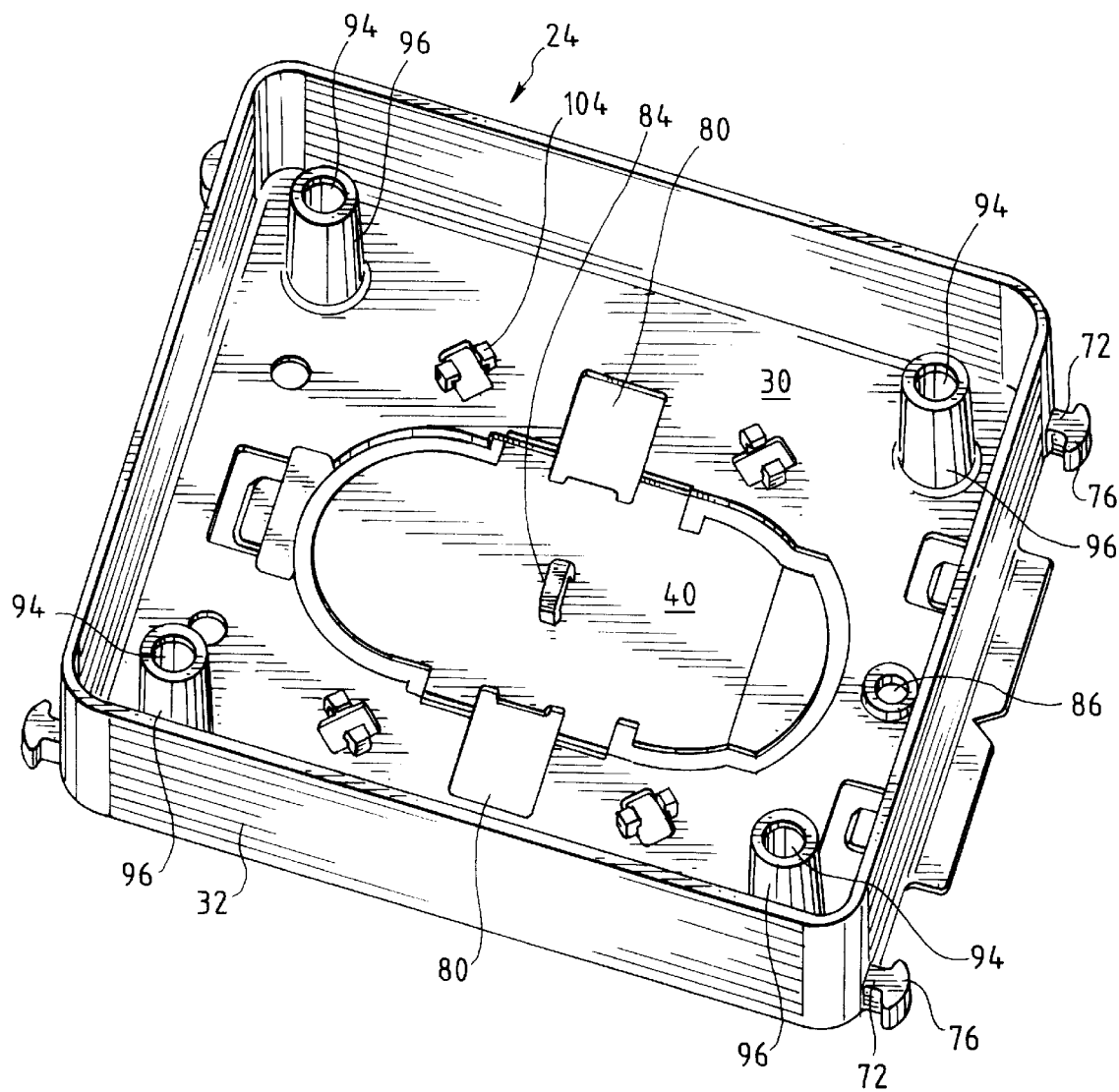
FIG. 4A is a top perspective view of a preset housing of FIG. 1.
Figure 4B:
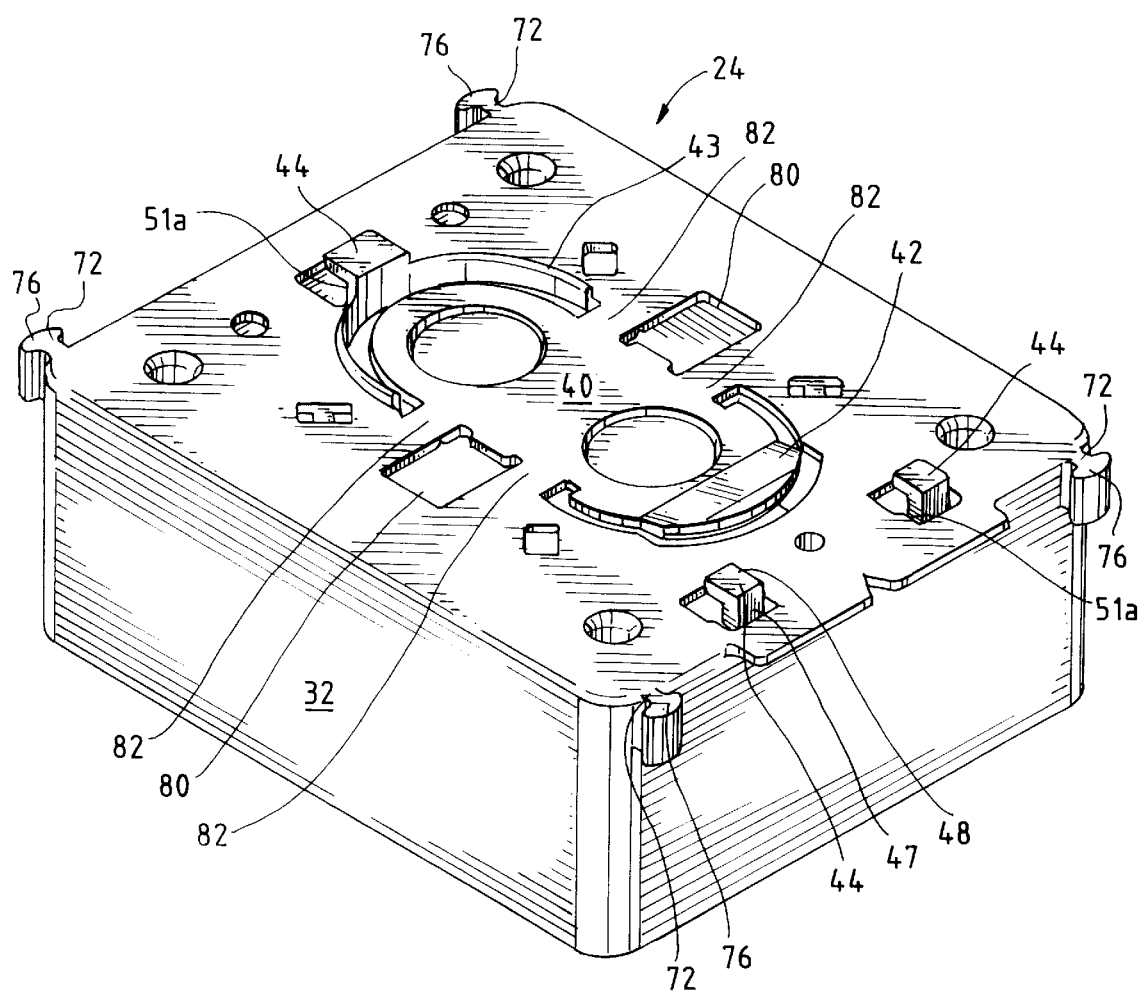
FIG. 4B is a bottom perspective view of a preset housing of FIG. 1.
Figure 5:
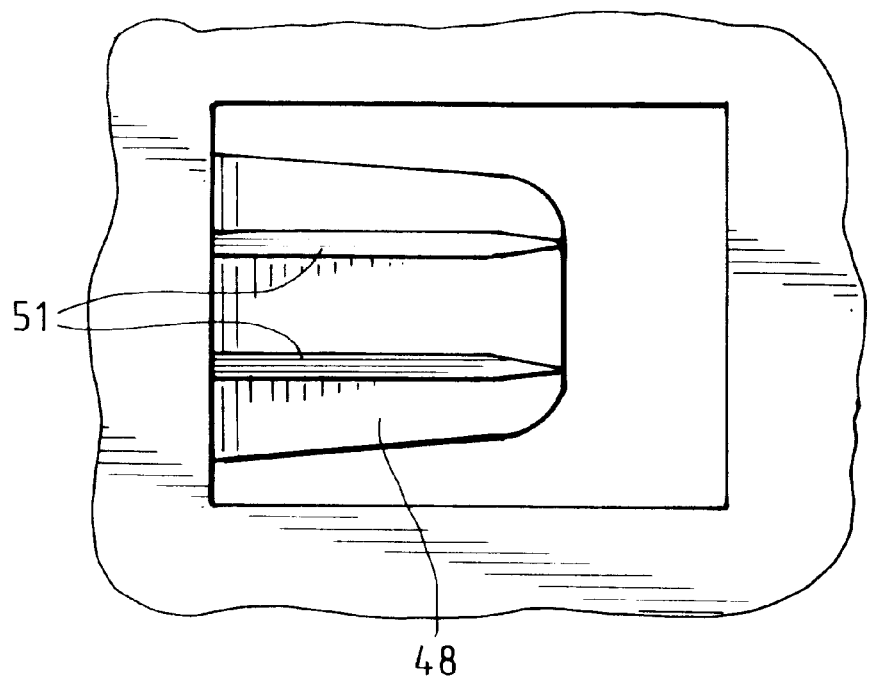
FIG. 5 is a top view of one of the locking tabs of the preset housing.
Figure 7:
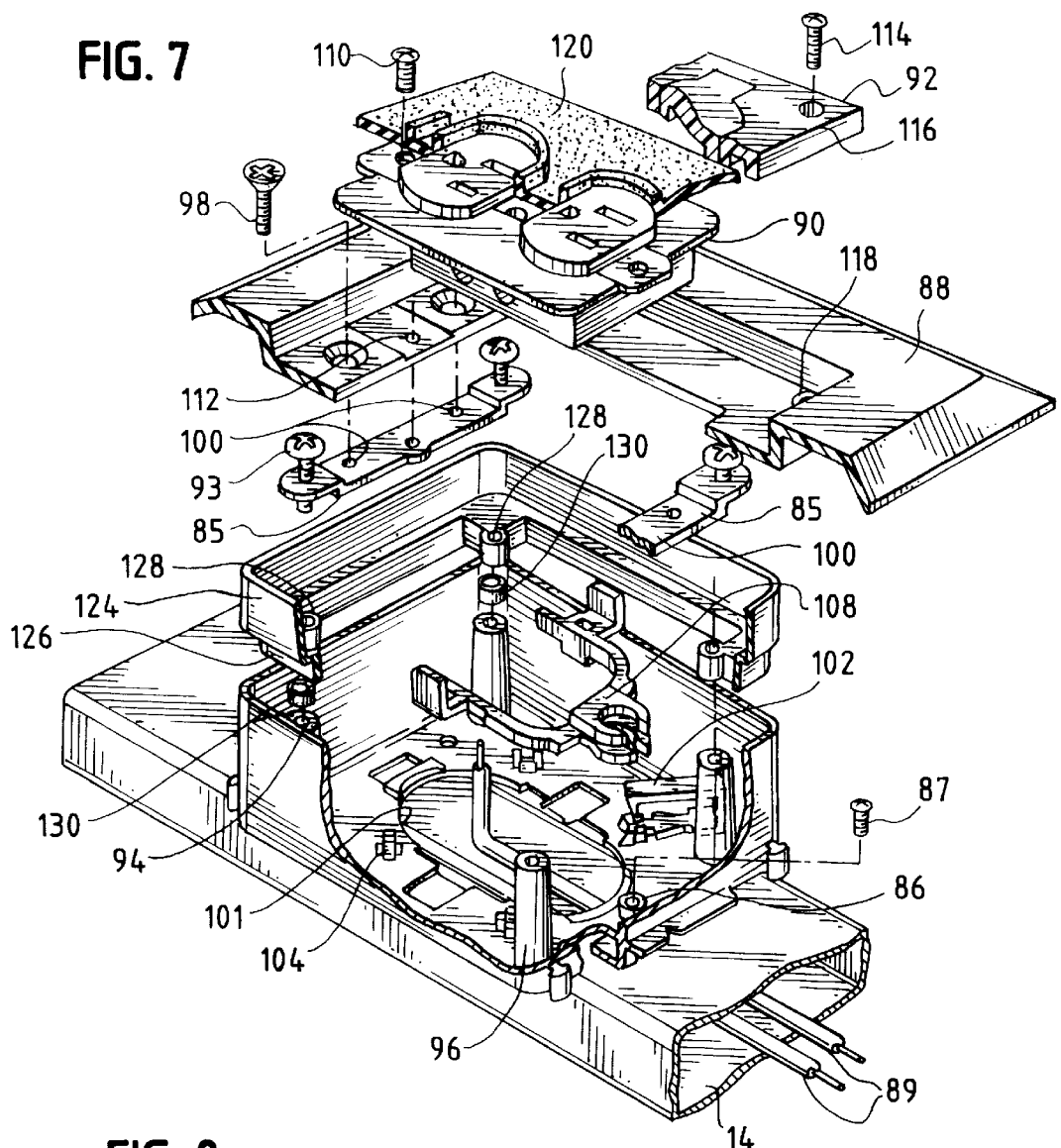
FIG. 7 is an exploded perspective view illustrating installation of the activation assembly into the preset housing.
Figure 8:
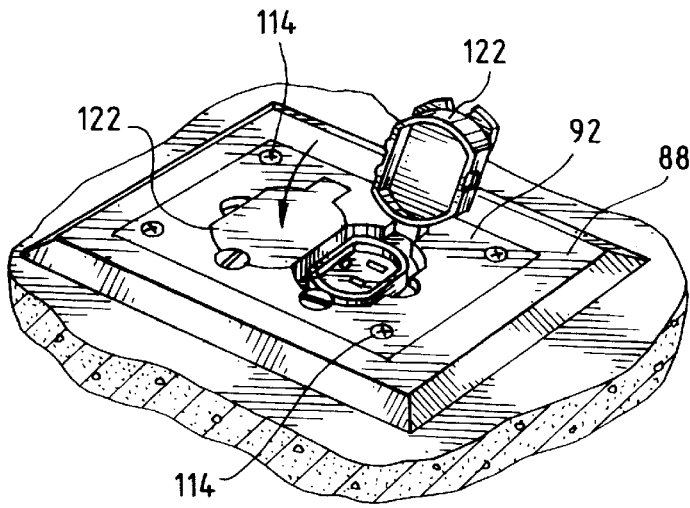
FIG. 8 is a top perspective view of the assembly of FIG. 4 after it has been installed in a concrete floor.

Installation of an activation kit into the preset 24 is illustrated in FIGS. 3, 7 and 8. Specifically, when a preset 24 is to be activated, the concrete overlying the preset is broken away to provide access to the concrete cap 36. The concrete cap 36 is then pried out of the preset (as is shown in FIG. 3). Striking the mud cap 36 at 78 with a screwdriver or cold chisel will deflect the edge inward to assist with removal of the concrete cap. Once the concrete cap 36 is removed, the knockout 40 is removed to gain access to the interior passage 20 of the raceway 12, as shown in FIG. 1. The knockout 40 can be pried out by inserting a screwdriver into the slots 80 formed at the periphery of the knockout and twisting the screwdriver to break the retaining tabs 82. An arched member 84 extends upwardly from the center of the knockout 40. A wire can be hooked through the arched member 84 to prevent the knockout 40 from falling into the raceway panel 12 as the knockout 40 is pried from the preset 24. Another function of the knockout is to prevent fish tapes from entering unactivated openings. Fish tapes may be pushed through the raceway panel 100 feet or more. With presets on 24" centers, the fish tape will easily pass by the unactivated presets.

Removal of the knockout creates an opening 101 that overlies the preset opening 22 in the raceway panel 12. Service cables 89 (e.g., electric wires, fiber optic cables, telephone lines, etc.) can be routed into and out of the raceway panel through the openings 22, 101. The top opening 34 in the preset 24 is configured to receive a variety of activation assemblies. In FIGS. 7 and 8, the activation assembly is illustrated as a flush mount duplex electrical outlet. It will be appreciated, however, that numerous other activation assemblies can be employed with the preset without departing from the scope of the claimed invention.

The duplex activation assembly includes link straps 85, a carpet flange 88, a duplex receptacle 90, and a concrete cap 92. The link straps 85 are secured in the inner compartment 26 of the preset 24 with self-taping screws 93 that thread into reciprocal bores 94 formed in upwardly extending bosses 96 located in the corners of the interior compartment 26. The carpet flange 88 overlies the top of the preset 24 and is secured thereto by screws 98 that thread into apertures 100 in the link straps 85. The service cables 89 carried in raceway panel 12 are routed up through the knockout opening 101 and into the interior compartment 26 of the preset 24. Excess wire can be looped around wire retaining clips 102 that are positioned around the periphery of the knockout opening 101. The wire retaining clips 102 are formed from a non-conductive material such as nylon and are adapted to snap into place into reciprocal mounting brackets 104 formed in the bottom wall of the interior compartment. As can be seen in FIG. 10, the wire retaining clips 102 are generally U-shaped and have forked bottom legs 106 which slide into the mounting brackets 104. A grommet 108 may be secured in the knockout opening 101 to provide a smooth, non-abrasive surface for pulling wires into and out of the raceway panel 12. The grommet 108 is made from a non-conductive material, such as nylon, and is constructed to snap into place in the opening 101 after the knockout 40 has been removed.

The wires 89 are appropriately connected to the electrical outlet 90 and the outlet is secured in place by mounting screws 110 that thread into apertures 112 the carpet flange 88. The concrete cap 92 is generally rectangular and is sized to fit within a reciprocal recess formed in the top of the carpet flange. Fasteners 114 extend through apertures 116 in the corners of the concrete cap 92 and thread into reciprocal apertures 118 in the carpet ring 88 to secure the concrete cap in place. A rubber gasket 120 may be interposed between the concrete cap 92 and the carpet flange 88 to prevent contaminants from entering the interior compartment. The concrete cap 92 has hinged doors 122 that can be pivoted upwardly to access the outlets in the duplex receptacle 90 (see FIG. 8).

A threaded aperture 86 extends through the bottom wall of the preset and overlies the top wall 18 of the raceway. A screw 87 is threaded through the aperture 86 and until it engages securely against the top wall 18 of the raceway 12 to provide ground continuity between the preset and the raceway.

As shown in FIG. 7, an extension sleeve 124 may be interposed between the preset housing 24 and the carpet flange 88 to increase the depth of the preset 22 when a thicker concrete floor is required. The extension sleeve 124 is generally rectangular and includes a downwardly extending side wall 126 sized to fit within the side wall of the preset 24. Bosses 128 are positioned in the extension sleeve 124 to align with the bosses 96. The extension sleeve 124 is secured in place by coupling rings 94 that are press fit between bosses 94 and 96. Alternatively, the extension sleeve may be secured in place by self taping screws (not shown) which extend through the boss 94 and thread into the bosses 96.

Figure 12:
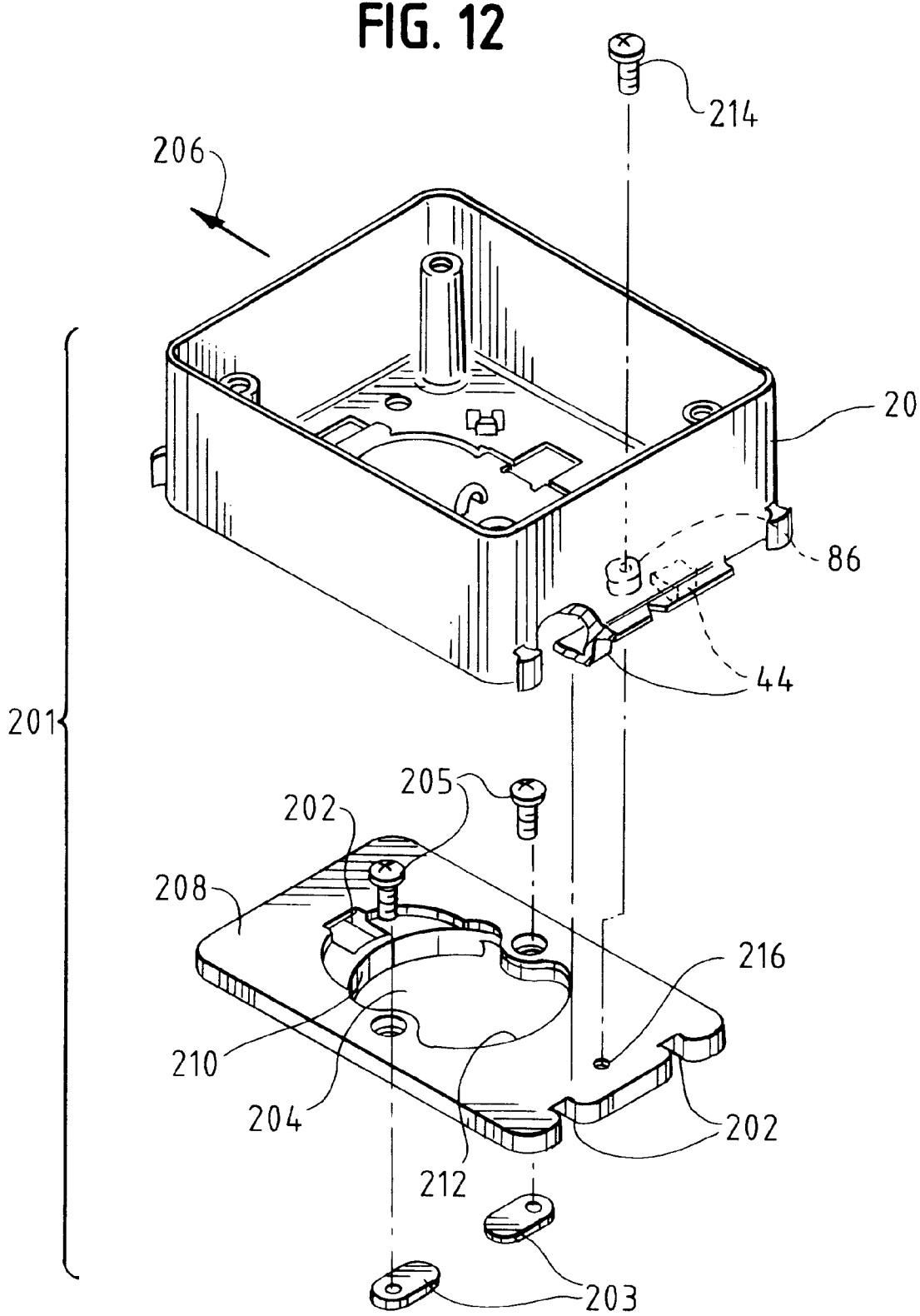
FIG. 12 is a perspective view of an adapter that can be used in combination with the preset housing of FIG. 1 to convert the preset housing into an afterset housing.

Referring now to FIG. 12, an adapter 200 for converting the preset 20 into an afterset is described. (In the description of FIGS. 12 and 13, the term "afterset" is used to refer to the composite assembly of the preset 12 and the adapter 200. The afterset is identified in these Figs. by reference numeral 201). The adapter 200 is generally in the form of a rectangular plate, which is configured to slidably engage with the bottom wall 30 of the preset 20. For this purpose, the adapter 200 includes three slots 202 that are configured to align with and receive the locking tabs 44. The adapter 200 further includes central opening 204 that is configured to align with the knockout opening 101 when the adapter 200 is connected to the preset 20. The afterset 201 also includes a pair of locking tabs 203 that are secured to the bottom face of the adapter 200 respective tab screws 205. The tab screws 205 can be accessed through the slots 80 when the preset 20 is connected to the adapter 200. The locking tabs 203 are used to secure the afterset 101 to a raceway as is explained below.

The preset 12 is secured to the adapter in a manner similar to the manner in which it is secured into a preset opening. In particular, the locking tabs 44 are aligned with the reciprocal apertures 202 in the adapter 200. The tabs 44 are then inserted downwardly into the apertures 202, while the preset is simultaneously slid in the direction of the arrow 206. As the tabs 44 move downwardly into the apertures 202, the lower edge of the protrusion 42 engages against the upper face 208 of the adapter panel 12. Further downward movement of the preset 12 biases the protrusion 42 upwardly. The preset 24 is slid in the direction of the arrow 206 until the trailing edge of the protrusion 42 extends past the edge of the opening 204, at which time the protrusion 42 springs downwardly to lock the preset 24 into the opening 204. At this position, the lower flanges 48 of the locking tabs 44 extend under the adapter 200, to further secure the preset 24 to the adapter 200.

Further movement in the direction of the arrow 206 is restricted by the interface between the legs 47 and the walls of the apertures 200, and also by abutment of the radial flange 43 against the front edge 210 of the preset opening 204. Conversely, movement in the direction opposite the arrow 206 is restricted by abutment of the protrusion 42 against the back edge 212 of the opening 204. The preset 20 is further secured to the adapter 200 by a fastener 214 that extends through the aperture 86 in the preset 20 and threads into a reciprocal opening 216 in the adapter 200.

The manner in which the afterset 201 is installed will now be described with reference to FIGS. 13a to 13f, which illustrate installation of a pair of ganged aftersets. Initially, the centerlines 220a, 220b of the raceways 222a, 222b are located, e.g., by using the markers (not shown) at the ends of the raceways or using existing fittings (not shown) in the raceways. Round core holes 224a, 224b on the order of 2.5 inches in diameter are then drilled through the concrete floor above the center of each of the raceways 222a, 222b. The drill is run through the concrete until it reaches the top of the raceway. The concrete slugs are then removed, leaving the round core holes 224a, 224b in the concrete. A concrete saw is then used to cut a rectangular opening 226 around the core holes. (See FIGS. 13b and 13c). The rectangular opening 228 should be slightly larger (on the order of ⅛ inch) than the outer dimensions of the afterset housing assembly (i.e., the ganged afterset housings). The rectangular slug 230 is then removed from the opening, e.g. with a hammer drill or similar device, leaving the rectangular opening 288 in the concrete above the raceways. Circular openings 232a, 232b on the order of 2.5 inches are then drilled through the top walls of the raceways 222a, 222b.

Figure 13A:
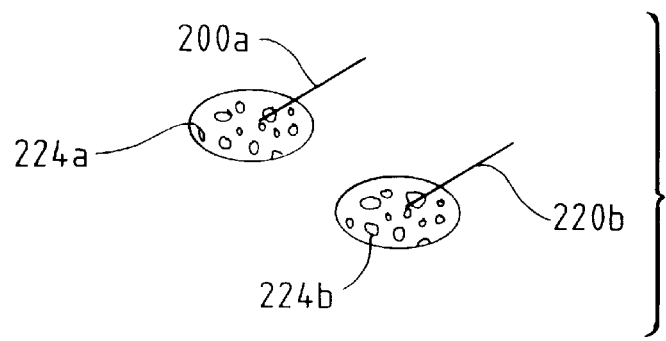
FIGS. 13a to 13f are schematic drawings illustrating installation of the afterset housing of FIG. 12 onto a raceway in a concrete floor.
Figure 13B:
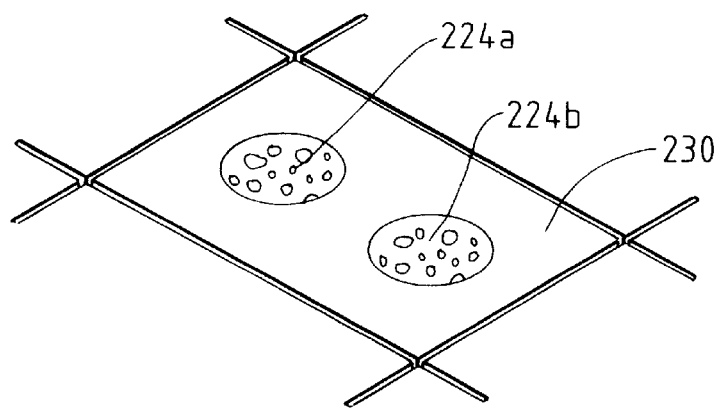
Figure 13C:
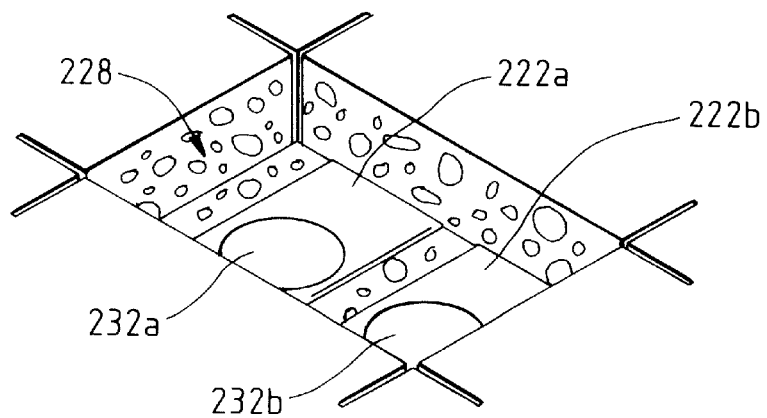
Figure 13D:
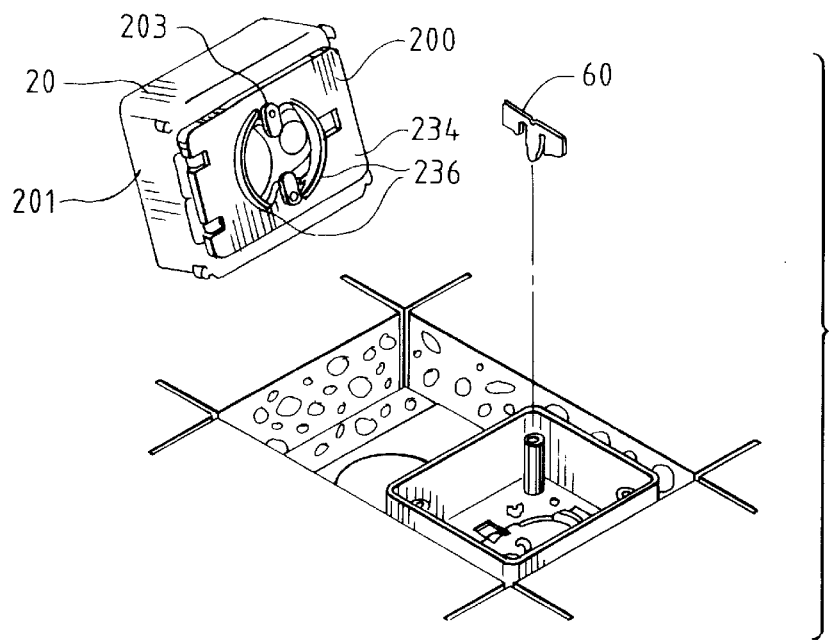
Figure 13E:
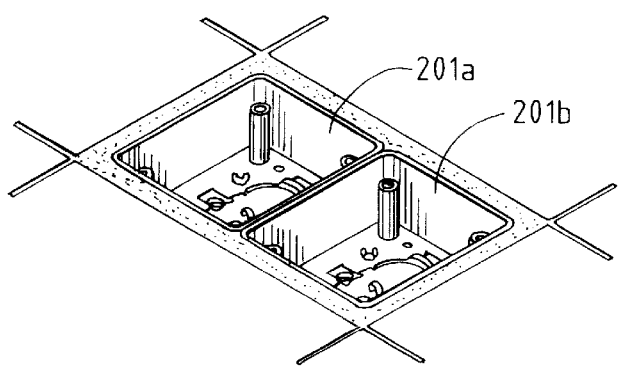
Figure 13F:
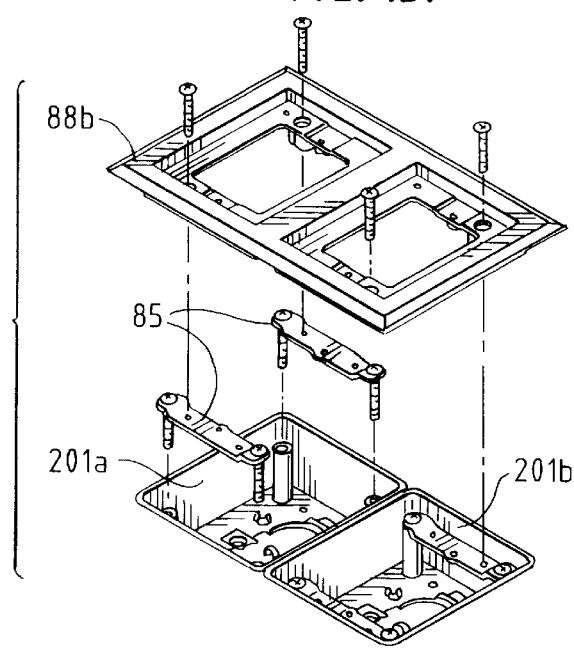
Figure 14:
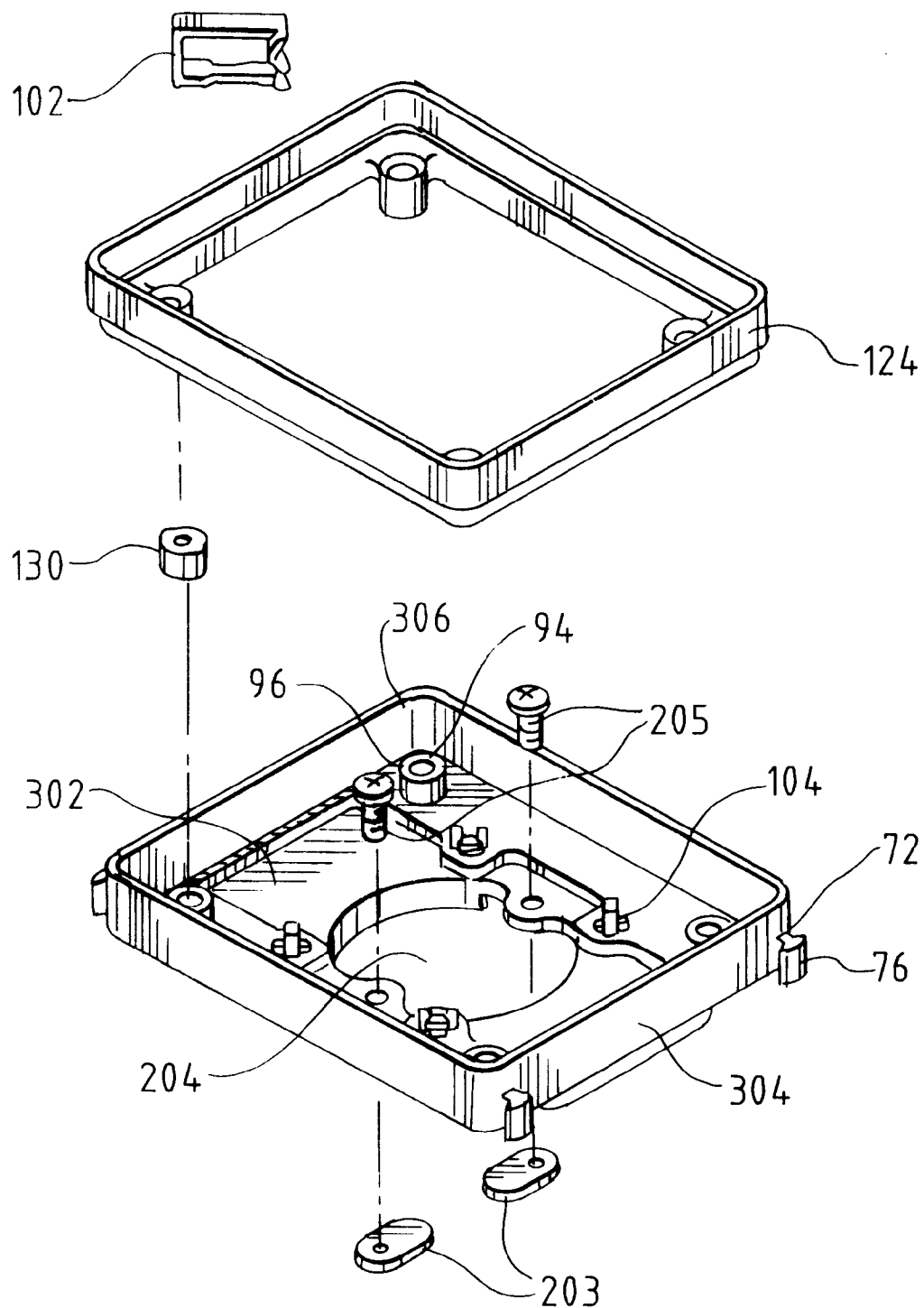
FIG. 14 is an exploded top perspective view of an afterset housing according to certain aspects of the present invention, shown in combination with an extension sleeve.

The afterset housing 201 are then inserted into the opening 228 in the concrete and secured to the raceways 222. Specifically, as can be seen in FIG. 13d, the bottom face 234 of the adapter 200 includes a radial flange 236 that surrounds the center opening 204. The radial flange 236 is sized for insertion into the circular opening 232 that has been cut in the top wall of the raceway 222. The afterset 201 is positioned on the raceway 220 with the locking tabs 203 turned toward the center of the opening 204. Once the afterset 201 is positioned on the raceway, the tab screws 205 are tightened. As the tab screws 205 are tightened, the locking tabs 203 rotate outwardly and secure under the top wall of the raceway 220 to secure the afterset 201 to the raceway.

Where multiple aftersets are ganged together adjacent aftersets are connected together with the alignments clips 60 in the manner described above in connection with FIGS. 9–10. It should be noted that in an afterset application, the center tooth 74 of the alignment may need to be shortened to avoid hitting the concrete that is located between the raceways. In this respect, the teeth should not extend beyond the bottom wall of the afterset when installed. The alignment clips 60 are installed prior to tightening the locking tab screws. The alignment clips 60 ensure that adjacent afterset housings 201 are properly aligned for receiving the cover plate, e.g. carpet flange. (See, e.g., FIG. 13f). The carpet flange 88b of FIG. 13b is similar to the carpet flange 88 of FIG. 7, except that it covers two afterset housings as opposed to a single housing. In thicker concrete floors, it may be necessary to install extension sleeves 124 between the afterset housing 201 and the carpet flange to increase the depth of the afterset in the manner described above.

After the alignment clips 60 are installed and the locking tabs are tightened into place, grout is used to fill the open areas around the afterset housings and the saw cuts. (See FIG. 13e) It may be desirable to install mud caps in the aftersets prior to pouring the grout. Once the grout is set, the grout above the mud caps is broken away and the mud caps are removed to provide access to the aftersets. Once the afterset housings are installed, the housings may be activated by installing the appropriate activation assemblies as was generally described above in connection with FIGS. 7 and 8. As will be appreciated, the knockouts 40 need to be removed from the preset prior to activation.

Figure 15:
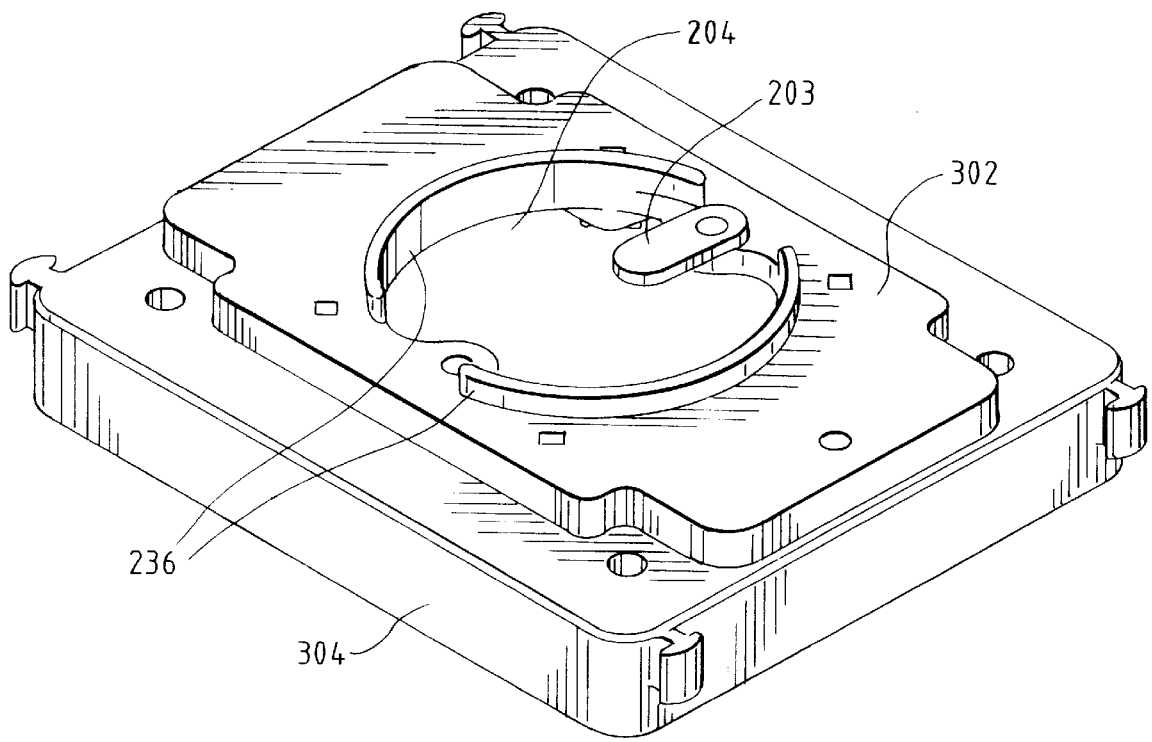
FIG. 15 is a bottom view of the afterset of FIG. 14.

FIGS. 14–17 illustrate an alternative embodiment of an afterset 300 in accordance with certain aspects of the present invention. The afterset 300 has a similar construction to the afterset 201, and hence, like components have been identified with the same reference numerals as were used above in connection the afterset 201. The primary difference is that the afterset shown in FIGS. 14–17 comprises an integral assembly, as opposed to the afterset 201 which consists of the preset housing 20 and the adapter 200. (See FIG. 15). The afterset 300 also does not employ the knockout of the above described afterset 201. Referring to FIG. 15, the bottom wall 302 of the afterset is stepped (e.g. by ¼ inch) along the sides to provide clearance for concrete that is not completely removed during formation of the afterset opening in the concrete floor.

The afterset 300 is configured to be mounted on a raceway in the manner described above. The afterset 300 defines a hollow interior compartment that is interconnectable with the interior passage 20 of the raceway through the opening 204 in the bottom wall 302 of the afterset. The afterset has generally rectangular housing consisting of the bottom wall 302, and an upstanding side wall 304 that defines a top opening 306. As will be appreciated, the aftersets can be made in a variety of depths to accommodate floors of different thickness'. Referring to FIG. 15, the radial flange 236 extends from the bottom wall 302 of the afterset 300 and is configured for insertion into a reciprocal opening in the raceway. Tabs 72 extend from the corners of the afterset 300 to allow the aftersets to be ganged together via the clips 60.

Figure 16:
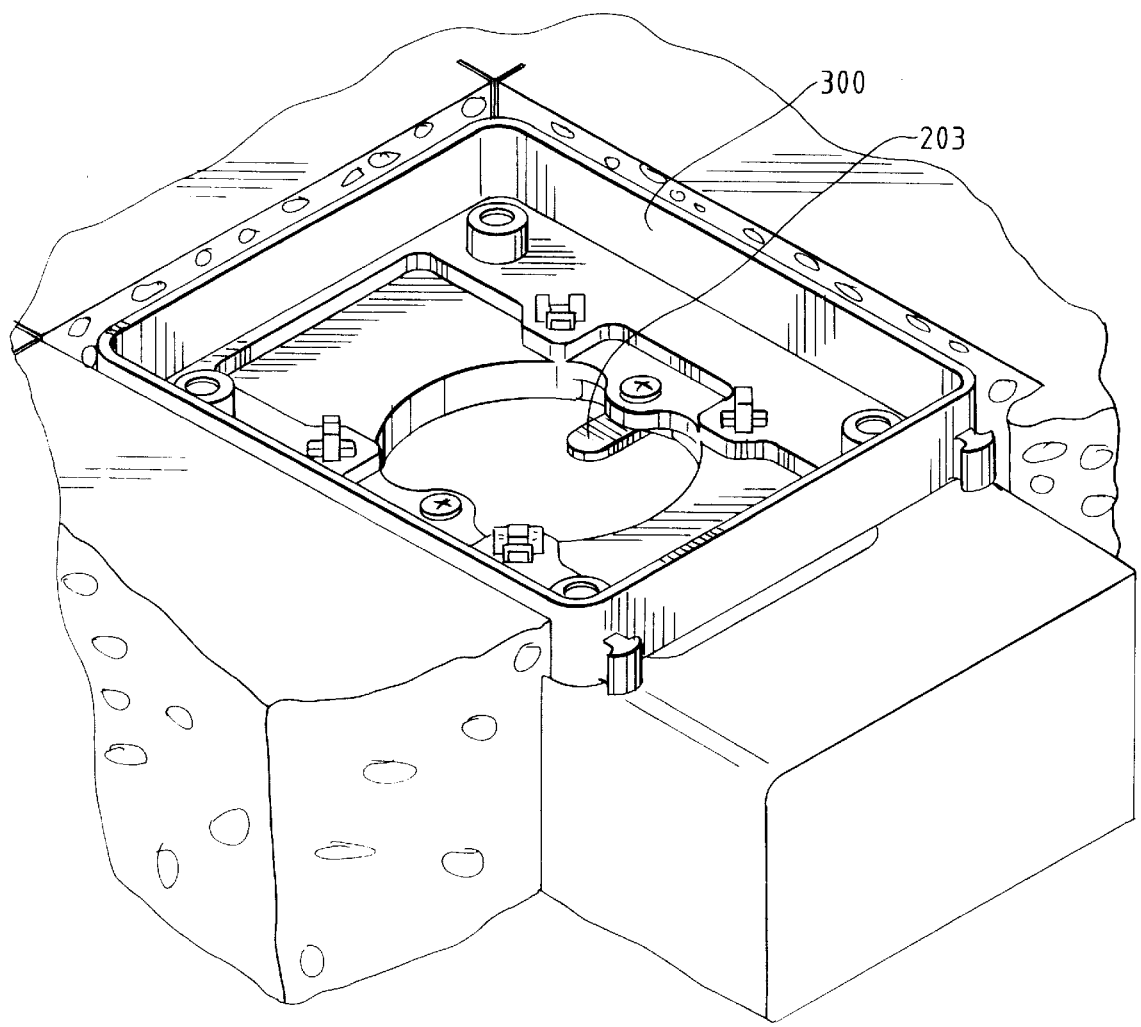
FIG. 16 is a top perspective view showing the afterset of FIG. 14 installed on a raceway, prior to activation of the afterset.
Figure 18A:
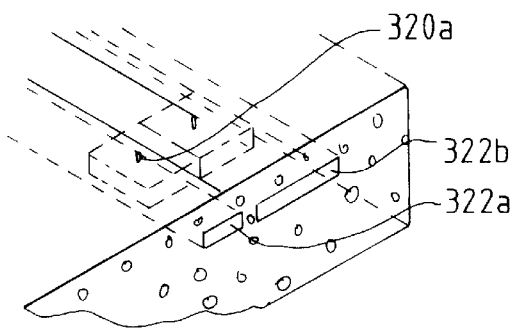
Figure 18B:
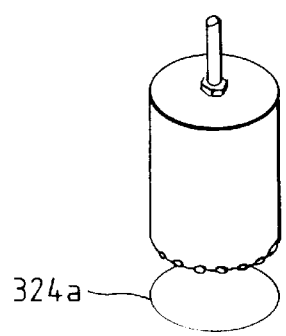
Figure 18C:
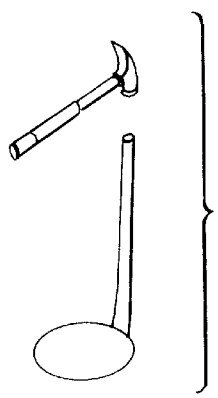
Figure 18D:
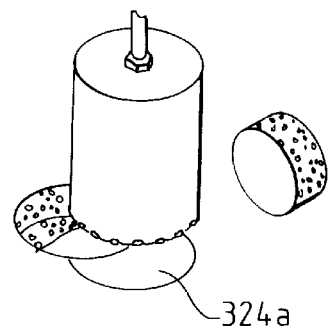
Figure 18E:
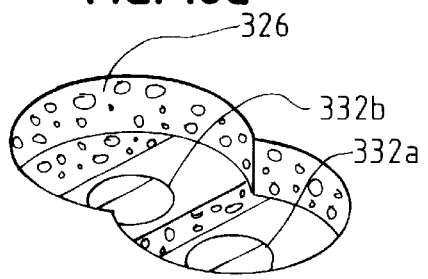
Figure 18F:
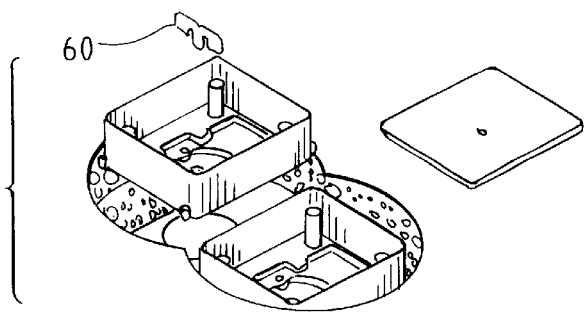
Figure 18G:
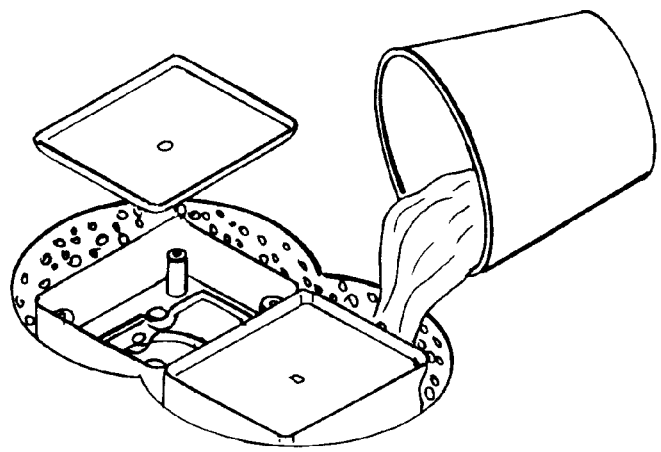
Figure 18H:
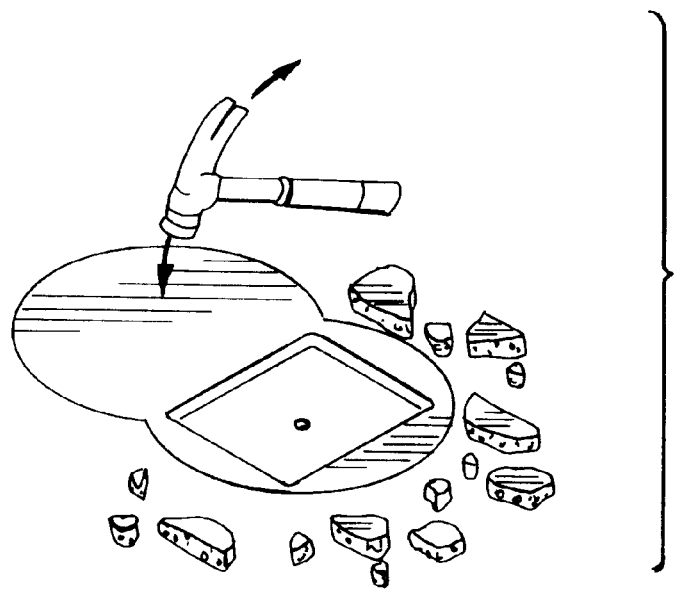

FIG. 16 illustrates installation of a single afterset 300 on a raceway. The afterset in FIG. 16 is shown prior to activation. FIG. 17 illustrates a three gang afterset application following activation. As can be seen in FIG. 17, the aftersets are configured to receive a wide variety of activation assemblies. In the installation shown in FIG. 17, the one afterset houses coaxial connectors 240, another afterset houses duplex outlet 242, and the third afterset houses data jacks 244. A single carpet ring 88c extends over the top of the three ganged housings. Proper alignment of the adjacent afterset housings is ensured through the use of the alignment clips 60, as was described above.

Mounting brackets 104 are formed in the bottom wall of the interior compartment for receiving the wire retaining clips 102. An extension sleeve 124 may be interposed between the afterset 300 and the carpet flange to increase the depth of the afterset. As will be appreciated, the sleeve may be provided in different heights to accommodate floors of different thickness'. The afterset may also be manufactured in a variety of depths to accommodate floors of different thickness.

Referring now to FIGS. 18a to 18i, an alternative method of the afterset 201 will now be briefly described. The method is generally similar to that set forth above in connection with FIGS. 13a to 13f. Initially, the centerlines 320a, 320b of the raceways 322a, 322b are located, e.g., by using the markers (not shown) at the ends of the raceways or using existing fittings in the raceways. (See FIG. 18a). A round core hole 324a on the order of 6.5 to 7 inches in diameter is then drilled through the concrete floor above the center of one of the raceways 322a. (See FIG. 13b). The drill is run through the concrete until it reaches the top of the raceway. The concrete slug is then removed, leaving an opening 326 in the concrete over the raceway. (See FIGS. 13c and 13d). If more than one afterset is to be installed at the location, the above steps are repeated for the additional to provide access to the other raceway 322b. (See, e.g. FIG. 18d). It should be noted that both holes could be drilled before removing either of the concrete slugs.

Once the concrete is removed from above the raceways, circular openings 332a, 332b on the order of 2.5 inches are drilled through the top walls of the raceways 322a, 322b. The afterset housing 201 are then inserted into the opening 326 in the concrete and positioned on the raceways 322 in the manner described above. Where multiple aftersets are ganged together, the adjacent aftersets are connected together with the alignments clips 60 in the manner described above. After the alignment clips 60 are installed and the locking tabs are tightened into place, grout is used to fill the open areas around the afterset housings. (See FIGS. 18g and 18h). Preferably, mud caps are installed in the aftersets before the grout is poured. (See FIG. 18g). Once the grout has hardened, the grout over the mud caps is broken away and the mud caps are removed to provide access to the aftersets. (See FIG. 18h). Once the afterset housings are installed, the housings may be activated by installing the appropriate activation assemblies as was generally described above.

What is claimed is:

1. An afterset housing for providing access to an underfloor electrical distribution system of the type comprising at least one raceway panel embedded in a concrete floor, the afterset comprising:

a preset housing having an interior compartment generally defined by a bottom wall and a sidewall, the preset housing be normally adapted for connection to said at least one raceway panel prior to pouring of the concrete floor; and an adapter connectable to the preset housing and being constructed to reconfigure the preset housing for use as said afterset housing which is adapted for connection to said at least one raceway panel following pouring of the concrete floor.

2. An afterset as set forth in claim 1, wherein the adapter slidably engagable with the bottom face of the preset housing.

3. An afterset as set forth in claim 1, wherein the preset housing is formed of metal.

4. An afterset as set forth in claim 1, wherein the preset housing is generally rectangular.

5. An afterset as set forth in claim 1, wherein multiple aftersets can be ganged together to form an integral assembly.

6. An afterset housing for providing access to an underfloor electrical distribution system of the type comprising at least one raceway panel embedded in a concrete floor, said at least one raceway panel having an interior passage defined by a top wall, a bottom wall and a pair of side walls, the afterset being configured for connection to the raceway panels by removing the concrete above said at least one raceway panel, cutting a hole in said at least one raceway panel, and securing the housing in the hole in the raceway, the afterset comprising:

a housing adapted for connection to the top wall of said at least one raceway, the housing having an interior compartment generally defined by a bottom wall and an upwardly extending sidewall, the sidewall being adapted to receive an activation assembly, the bottom wall including an aperture adapted for alignment with the aperture formed in the top wall of the raceway panel to provide access to services that are carried by the raceway; and means for ganging at least two of the housings together to form an integral assembly, said ganging means comprising at least one alignment clip being adapted to slidably engage with a pair of adapter housings to form an integral assembly.

7. An afterset housing as set forth in claim 6, wherein said ganging means further comprises at least on ganging tab formed on the exterior of each afterset housing, the ganging tabs being configured to receive the alignment clip.

8. An afterset as set forth in claim 6, wherein the preset housing is formed of metal.

9. An afterset as set forth in claim 6, wherein the preset housing is generally rectangular.

10. An afterset as set froth in claim 6, further comprises at least one locking tab adapted to secure the afterset to the top wall of said at least one raceway panel.

11. An afterset as set forth in claim 6, further comprising a radial flange extending downwardly from the bottom wall of the housing and being configured for insertion into the opening in the top wall of the raceway.

12. An underfloor electrical distribution system for placement in a concrete floor comprising:

first and second raceway panels extending generally parallel to each other within the concrete floor, each raceway panel having a top wall, a bottom wall and a pair of side walls defining an interior passage;

a plurality of afterset housings, each housing being configured for connection to one of said first and second raceway panels by removing the concrete above the respective raceway panel, cutting a hole in the respective raceway panel, and securing the afterset housing in the hole in the respective raceway panel; and a plurality of alignment clips, each clip being adapted to secure two of the afterset housings together to form an integral afterset assembly.

13. An underfloor electrical distribution system as set forth in claim 12, wherein the alignment clips are adapted to slidably engage with the afterset housings.

14. An underfloor electrical distribution system as set forth in claim 12, wherein each afterset housing has an interior compartment generally defined by a bottom wall and an upwardly extending sidewall, the bottom wall including an aperture that aligns with the opening formed in the top wall of a raceway panel when the adapter is connected thereto to provide access to services that are carried by the raceway panel.

15. An underfloor electrical distribution system as set forth in claim 14, wherein each afterset further comprises at least one locking tab adapted to secure the afterset to the top wall of the raceway.

16. An underfloor electrical distribution system as set forth in claim 14, wherein each afterset further comprises a radial flange extending downwardly from the bottom wall of the housing and being configured for insertion into the opening in the top wall of the raceway.

17. An underfloor electrical distribution system as set forth in claim 12, wherein the preset housings are formed of metal.

18. An underfloor electrical distribution system for placement in a concrete floor comprising:
 a pair of raceway panels adapted to be positioned on a subfloor prior to pouring of the concrete floor, each raceway panel defining an interior passage and a plurality of preset openings that provide access to the interior passage;
 a plurality of preset housings mountable in the preset openings and to provide access to the interior passage of said pair of raceway panels from an upper surface of the concrete floor; and
 a plurality of alignment clips, each alignment clip being adapted to secure and align a preset housing carried by a first of the raceway panels with a second preset housing carried by a second of the raceway panels.

19. An underfloor electrical distribution system as set forth in claim 18, wherein each preset housing has a concrete cap and a knockout section, the concrete cap and the knockout section being removable to provide access to an interior compartment of the preset housing, the knockout being configured to align with and lockingly engage with the preset opening to secure the preset to the raceway panel during pouring of the concrete floor, whereby upon hardening of the concrete floor the concrete above the preset can be broken away to permit removal of the concrete cap, whereupon the knockout can be removed to provide access to the interior passage of the raceway panel through the preset.

20. An underfloor electrical distribution system as set forth in claim 18, wherein each preset housing comprises a bottom wall, a side wall extending from the base and defining an upper opening configured to receive the concrete cap.

21. An in-floor electrical distribution system as set forth in claim 18, further comprising a locking tab extending from the bottom wall of the housing, the locking tab being adapted to slidably engage with the raceway panel opening as the knockout protrusion is engaged with the raceway opening.

22. An underfloor electrical distribution system as set forth in claim 18, wherein the preset housings are formed of plastic.

23. An underfloor electrical distribution system as set forth in claim 18, wherein the preset housings are formed of metal.

24. An underfloor electrical distribution system as set forth in claim 23, wherein each preset housing further includes a plurality ribs extending from its bottom wall, the ribs being adapted to engage against the surface of the raceway panel when the preset is mounted on the raceway panel to provide ground continuity between the raceway panel and the preset.

25. An underfloor electrical distribution system as set forth in claim 18, wherein the preset housings are generally rectangular.

26. An underfloor electrical distribution system as set forth in claim 18, wherein the preset further comprises wire retaining clips removable mountable in the interior compartment about the periphery of the knockout section.

27. An underfloor electrical distribution system as set forth in claim 18, wherein the upper opening of the housing is adapted to receive an access assembly upon removal of the concrete cap.

28. A preset for providing access to an underfloor electrical distribution system, the underfloor electrical distribution system comprising at least one raceway panel adapted to be positioned in a concrete floor, the raceway panel defining an interior passage adapted to carry service cables and having an exterior wall defining preset openings that provide access to the interior passage, the preset comprising:
 a housing mountable in the preset opening and to provide access to the interior passage of the raceway from an upper surface of the concrete floor; and
 ganging means for ganging at least two of the housings together to form an integral assembly, said ganging means comprising at least one adapter clip configured to slidably engage with a pair of preset housings to form an integral assembly.

29. A preset housing as set forth in claim 28, wherein said ganging means further comprises at least one ganging tab formed on the exterior of each afterset housing, the ganging tabs being configured to slidably engage with the adapter clips.

\* \* \* \* \*